US009029733B2

(12) United States Patent
Barhorst et al.

(10) Patent No.: US 9,029,733 B2
(45) Date of Patent: May 12, 2015

(54) SYSTEMS AND METHODS FOR TUBULAR WELDING WIRE

(75) Inventors: Steven Barhorst, Sidney, OH (US); Joseph Bundy, Piqua, OH (US); Michael Bertram, Troy, OH (US)

(73) Assignee: Hobart Brothers Company, Troy, OH (US)

( * ) Notice: Subject to any disclaimer, the term of this patent is extended or adjusted under 35 U.S.C. 154(b) by 161 days.

(21) Appl. No.: 13/446,796

(22) Filed: Apr. 13, 2012

(65) Prior Publication Data

US 2013/0270244 A1    Oct. 17, 2013

(51) Int. Cl.
| | |
|---|---|
| B23K 9/00 | (2006.01) |
| B23K 33/00 | (2006.01) |
| B23K 35/00 | (2006.01) |
| B23K 35/02 | (2006.01) |
| B23K 35/24 | (2006.01) |
| B22F 7/04 | (2006.01) |
| B23K 35/30 | (2006.01) |

(52) U.S. Cl.
CPC .................. *B23K 35/3073* (2013.01)

(58) Field of Classification Search
CPC ........... B23K 35/3053; B23K 35/0261; B23K 35/0266; B23K 35/3066; B23K 35/308; B23K 9/23; B23K 9/16; B23K 9/173; B23K 33/004; B23K 9/035; B23K 9/0026; B23K 9/092; B23K 9/091; B23K 9/09
USPC ............... 219/145.22, 146.22, 146.23, 146.3, 219/146.31, 137 WM, 145.21, 145.23, 219/145.31, 145.32, 146.21, 146.32, 219/146.41, 146.51, 146.52, 147; 428/558–564
See application file for complete search history.

(56) References Cited

U.S. PATENT DOCUMENTS

| | | | | | |
|---|---|---|---|---|---|
| 2,170,019 | A | * | 8/1939 | Gaylord | 228/244 |
| 2,902,587 | A | * | 9/1959 | Bernard | 219/74 |
| 3,303,323 | A | * | 2/1967 | Claussen | 219/137 R |
| 3,308,266 | A | * | 3/1967 | Adams, Jr. | 219/137 R |
| 3,495,069 | A | * | 2/1970 | Cavanagh et al. | 219/146.41 |
| 3,531,620 | A | * | 9/1970 | Horiuchi et al. | 219/146.52 |
| 3,787,658 | A | * | 1/1974 | Kammer et al. | 219/146.41 |
| 3,924,091 | A | * | 12/1975 | Suzuki et al. | 219/73 |
| 3,980,859 | A | * | 9/1976 | Leonard | 219/104 |
| 4,149,063 | A | * | 4/1979 | Bishel | 219/146.23 |
| RE30,799 | E | * | 11/1981 | Zvanut et al. | 219/74 |
| 4,430,545 | A | * | 2/1984 | Mori et al. | 219/73 |
| 4,900,895 | A | * | 2/1990 | Marshall | 219/145.22 |
| 4,999,479 | A | * | 3/1991 | Paton et al. | 219/145.22 |
| 5,332,628 | A | * | 7/1994 | Drossman | 428/558 |
| 6,608,284 | B1 | * | 8/2003 | Nikodym | 219/137 WM |
| 6,927,361 | B2 | * | 8/2005 | Kelly et al. | 219/137 WM |

(Continued)

FOREIGN PATENT DOCUMENTS

| | | |
|---|---|---|
| EP | 2289661 | 3/2011 |
| GB | 1183463 | 3/1970 |

OTHER PUBLICATIONS

International Search Report from PCT application No. PCT/US2013/035877 dated Aug. 8, 2013, 9 pgs.

*Primary Examiner* — Dana Ross
*Assistant Examiner* — Gyounghuyn Bae
(74) *Attorney, Agent, or Firm* — Fletcher Yoder, P.C.

(57) ABSTRACT

A tubular welding wire includes a granular core and a metal sheath encircling the granular core. Furthermore, the metal sheath includes at least approximately 0.3% manganese by weight and at least approximately 0.05% silicon by weight.

15 Claims, 2 Drawing Sheets

(56) References Cited

U.S. PATENT DOCUMENTS

| | | |
|---|---|---|
| 2006/0165552 A1 | 7/2006 | Kapoor |
| 2007/0181549 A1* | 8/2007 | Hartman et al. ...... 219/137 WM |
| 2007/0187379 A1* | 8/2007 | Osuki et al. .......... 219/137 WM |
| 2008/0057341 A1* | 3/2008 | Bouillot et al. ............... 428/685 |
| 2008/0121629 A1* | 5/2008 | Kiser .................... 219/137 WM |
| 2008/0128393 A1* | 6/2008 | Frankel et al. ................. 219/75 |
| 2008/0272100 A1 | 11/2008 | Amata et al. |
| 2009/0241336 A1* | 10/2009 | Karnes et al. ................... 29/868 |
| 2010/0227196 A1* | 9/2010 | Narayanan .................... 428/683 |
| 2011/0073570 A1* | 3/2011 | Shimura et al. ................ 219/74 |

* cited by examiner

SYSTEMS AND METHODS FOR TUBULAR WELDING WIRE

BACKGROUND

The invention relates generally to welding and, more specifically, to electrodes for arc welding, such as Gas Metal Arc Welding (GMAW) or Flux Core Arc Welding (FCAW).

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Submerged Arc Welding (SAW) or Flux Core Arc Welding (FCAW)), typically employ a welding electrode in the form of welding wire. Welding wire may generally provide a supply of filler metal for the weld, as well as provide a path for the current during the welding process.

BRIEF DESCRIPTION

In an embodiment, a tubular welding wire includes a granular core and a metal sheath encircling the granular core. Furthermore, the metal sheath comprises at least approximately 0.3% manganese by weight and at least approximately 0.05% silicon by weight.

In another embodiment, a method of manufacturing a tubular welding wire includes compressing a metallic sheath around a powdered core. Furthermore, the metallic sheath includes at least approximately 0.6% manganese by weight and includes at least approximately 0.1% silicon by weight.

In another embodiment, a method of producing a weld on a workpiece includes feeding a tubular welding electrode to a welding torch near the workpiece. The tubular welding electrode has a metal sheath surrounding a granular core and the metal sheath includes manganese and silicon. The method further includes forming an arc between the tubular welding electrode and the workpiece and incorporating at least a portion of the manganese from the metal sheath into the weld.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
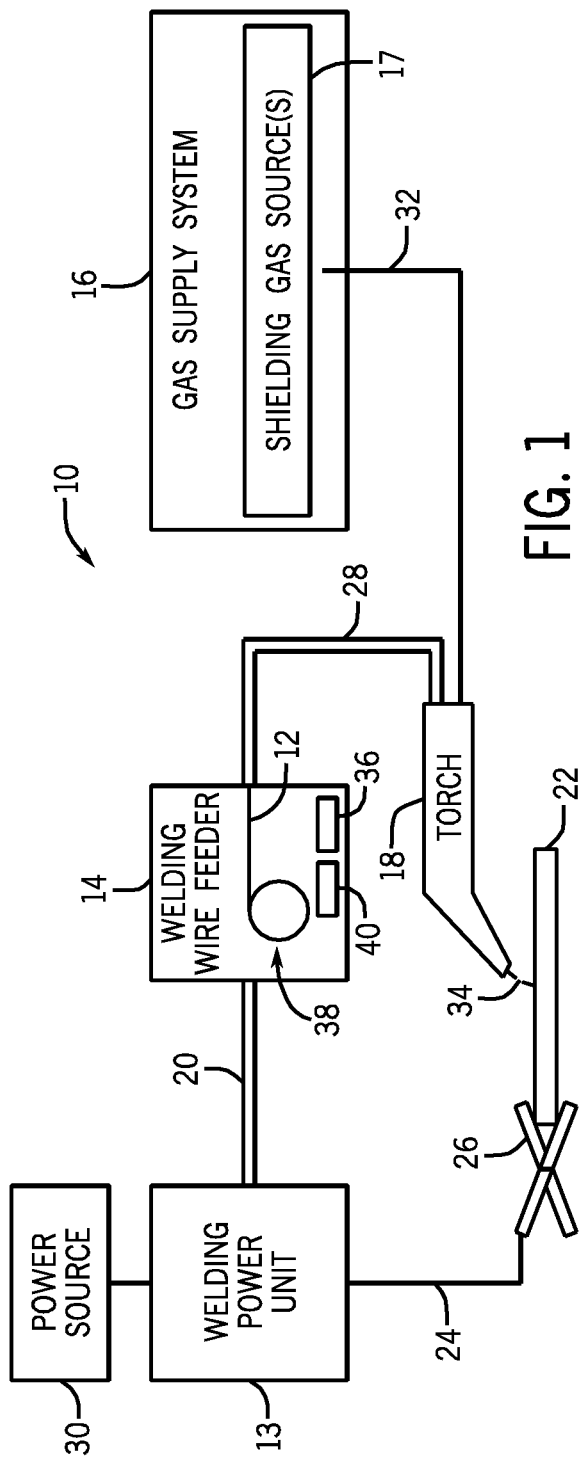
FIG. 1 is a block diagram of a gas metal arc welding (GMAW) system, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The presently disclosed tubular welding wire embodiments may include one or more components (e.g., flux, arc stabilizers, or other additives) that generally alter the welding process and/or the properties of the resulting weld. Furthermore, it may be appreciated that, in addition to the chemical properties provided by the tubular welding wire (e.g., the chemical composition of the weld and the fumes produced during welding), it may be desirable for the tubular welding wire to have certain physical properties as well. For example, since the tubular welding wire is consumed during welding, it may be constantly fed from a spool (e.g., in a welding wire feeder) to the welding torch. As such, if, for example, the stiffness of the welding wire is too low, then the welding wire may crumple, tangle, or otherwise improperly feed when the welding wire meets resistance during unspooling and/or feeding. This is especially a problem for smaller diameter tubular welding wires, which may generally be more prone to buckling. When the tubular welding wire buckles while feeding, it may form a tangled "bird's nest" that generally wastes welding wire and operator time as well as, in certain circumstances, adversely affecting operations of the welding system (e.g., welding wire feeder, wire spool, or similar wire feeding components of the welding system). Additionally, when the stiffness of a larger diameter welding wire is too low, the wire may be more likely to crush (e.g., making the tubular wire have an "egged" shape"), which may result in slippage and/or other inconsistencies in wire feeding that may have deleterious effects to the welding process. Accordingly, it may be desirable to have welding wire having a greater stiffness, so that it may be less likely to experience unspooling or feeding issues throughout the welding process.

As such, the tubular welding wire embodiments described herein have a metal sheath that includes one or more components, such as manganese and/or silicon, which may not be included in metals sheaths of other welding wires as presently disclosed. It should be appreciated that these components may include components that are provided by the granular core of conventional welding wires. Moreover, certain disclosed tubular welding wire embodiments also possess superior physical properties (i.e., stiffness and/or hardness) as a result of having these components loaded into the metal sheath rather than the granular core. In particular, the disclosed tubular welding wire embodiments include a substantially higher (e.g., two to three times higher) manganese content than conventional metal sheaths, which may improve the stiffness of the tubular welding wire and serve to increase the manganese content of the weld. Additionally, certain tubular welding wire embodiments include substantially higher (e.g., two to ten times higher) silicon content than conventional metal sheaths, which may also improve the stiffness of the tubular welding wire and serve to increase the silicon content in the weld. As such, the presently disclosed tubular welding wire enables greater flexibility in the selection of components for the granular core since at least a portion of these components may instead be delivered by the metal sheath. Furthermore, since the disclosed tubular welding wire provides benefits beyond improved stiffness, it should be appreciated that while the present discussion may be directed toward tubular welding wire, other embodiments (e.g., welding rods) having similar components are also presently contemplated.

Generally speaking, there are advantages to utilizing a tubular welding wire in which one or more components typically found in the granular core of the tubular welding wire are instead provided by the metal sheath, as presently disclosed. That is, certain components of typical tubular welding wire may be present within the granular core in order to affect the chemistry of the weld. Furthermore, since the tubular welding wire has a finite internal volume, by moving one or more components (e.g., manganese and/or silicon sources) from the granular core and into the metal sheath, more space may be available in the core of the tubular welding wire for other components (e.g., other metals, fluxes, stabilizers, or similar components). That is, the newly available space within the tubular welding wire may be dedicated to other additives to improve, for example, welding deposition rates. Generally speaking, the manganese and silicon content provided by the metal sheath of the presently disclosed tubular welding wire may provide deoxidation of the weld pool, which may also aid in weld pool wetting of the base metal being welded. Silicon, by specific example, may enable improved weld-bead wetting. For the disclosed embodiments, the relative manganese and silicon content included in the metal sheath may be balanced in order to balance the desired chemical properties (e.g., the deoxidation and wetting properties) and mechanical properties (e.g., stiffness).

Furthermore, by moving one or more components (e.g., manganese and/or silicon sources) from the granular core to the metallic sheath, the chemistry of the welding process may also be varied. For example, placing certain components (e.g., manganese and/or silicon sources) in the metallic sheath rather than the granular core may enable more freedom to select other components for the granular core (e.g., including components that are not otherwise compatible with the manganese and/or silicon sources). By further example, in certain embodiments, by placing one or more components (e.g., manganese and/or silicon sources) in the metallic sheath rather than the granular core, a greater portion of these components may become incorporated into the weld metal (e.g., rather than react with other components in the granular core and/or form fumes). Accordingly, it may be desirable to instead use the metal sheath of the tubular welding wire to deliver these components to the weld.

Turning to the figures, FIG. 1 is a block diagram of an embodiment of a gas metal arc welding (GMAW) system 10 that utilizes a tubular welding wire 12, in accordance with the present disclosure. It should be appreciated that, while the present discussion may focus specifically on the GMAW system 10 illustrated in FIG. 1, the presently disclosed welding wire may benefit any arc welding process (e.g., FCAW, FCAW-G, GTAW, submerged arc welding (SAW), or similar arc welding process) that uses a tubular welding wire (e.g., a tubular welding electrode or rod). It should be appreciated that certain welding system embodiments (e.g., SAW welding systems or GTAW welding systems) using the disclosed welding wire or electrode may include components not illustrated in the example GMAW system 10 (e.g., a flux hopper, a flux delivery component, a rod welding electrode, etc.) and/or not include components that are illustrated in the example GMAW system 10 (e.g., the gas supply system 16). It should also be appreciated that, in other embodiments, the presently disclosed tubular welding wire may be utilized as a "cold welding wire," in which the tubular welding wire does not carry the current (e.g., does not form the arc to the surface of the workpiece) during the welding process.

The welding system 10 includes a welding power unit 13, a welding wire feeder 14, a gas supply system 16, and a welding torch 18. The welding power unit 13 generally supplies power to the welding system 10 and may be coupled to the welding wire feeder 14 via a cable bundle 20 as well as coupled to a workpiece 22 using a lead cable 24 having a clamp 26. In the illustrated embodiment, the welding wire feeder 14 is coupled to the welding torch 18 via a cable bundle 28 in order to supply consumable, tubular welding wire 12 (e.g., the welding electrode) and power to the welding torch 18 during operation of welding system 10. In another embodiment, the welding power unit 13 may couple and directly supply power to the welding torch 18.

The welding power unit 13 may generally include power conversion circuitry that receives input power from an alternating current power source 30 (e.g., an AC power grid, an engine/generator set, or a combination thereof), conditions the input power, and provides DC or AC output power via the cable 20. As such, the welding power unit 13 may power the welding wire feeder 14 that, in turn, powers the welding torch 18, in accordance with demands of the welding system 10. The lead cable 24 terminating in the clamp 26 couples the welding power unit 13 to the workpiece 22 to close the circuit between the welding power unit 13, the workpiece 22, and the welding torch 18. The welding power unit 13 may include circuit elements (e.g., transformers, rectifiers, switches, and so forth) capable of converting the AC input power to a direct current electrode positive (DCEP) output, direct current electrode negative (DCEN) output, DC variable polarity, or a variable balance (e.g., balanced or unbalanced) AC output, as dictated by the demands of the welding system 10. It should be appreciated that the presently disclosed tubular welding wire 12 may enable improvements to the welding process (e.g., improved wire feeding, improved arc stability, and/or improved weld quality) for a number of different power configurations.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In other embodiments, the gas supply system 16 may instead be coupled to the wire feeder 14, and the wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via the conduit 32) may include Ar, Ar/$CO_2$ mixtures, Ar/$CO_2$/$O_2$ mixtures, Ar/He mixtures, and so forth.

Accordingly, the illustrated welding torch 18 generally receives the welding electrode (i.e., the welding wire), power from the welding wire feeder 14, and a shielding gas flow from the gas supply system 16 in order to perform GMAW of the workpiece 22. During operation, the welding torch 18 may be brought near the workpiece 22 so that an arc 34 may be formed between the consumable welding electrode (e.g., the tubular welding wire 12 exiting a contact tip of the welding torch 18) and the workpiece 22. Additionally, as discussed below, by controlling the composition of the welding electrode (e.g., the tubular welding wire 12), the chemistry of the arc 34 and/or the resulting weld (e.g., composition and physical characteristics) may be tuned. For example, the tubular welding wire 12 may include any number of fluxing and/or alloying components that may act as arc stabilizers and, further, may become at least partially incorporated into the weld, affecting the mechanical properties of the weld. Furthermore, certain components of the welding electrode (i.e., the tubular welding wire 12) may also provide additional shielding atmosphere near the arc 34, affect the transfer properties of the arc 34, and/or deoxidize the surface of the workpiece 22.

The welding wire feeder 14 also includes components for feeding the tubular welding wire 12 to the welding torch 18, and thereby to the welding application, under the control of a controller 36. For example, in certain embodiments, one or more wire supplies (e.g., a wire spool 38) of tubular welding wire 12 may be housed in the welding wire feeder 14. A wire feeder drive unit 40 may unspool the tubular welding wire 12 from the spool 38 and progressively feed the tubular welding wire 12 to the welding torch 18. To that end, the wire feeder drive unit 40 may include components such as circuitry, motors, rollers, and so forth, configured in a suitable way for establishing an appropriate wire feed. For example, in one embodiment, the wire feeder drive unit 40 may include a feed motor that engages with feed rollers to push wire from the welding wire feeder 14 towards the welding torch 18. Additionally, power from the welding power unit 13 may be applied to the fed wire.

However, during this wire feeding process, if the stiffness of the tubular welding wire 12 is insufficient, then the welding wire 12 may crumple, tangle, or otherwise improperly feed. For example, the tubular welding wire 12 may form a tangled "bird's nest" of welding wire (e.g., in the spool 38 and/or the wire feeder drive unit 40) instead of properly feeding to the welding torch 18. Since such wire misfeeds may result in the welding operator ceasing welding operations so that the improperly fed tubular welding wire may be removed, these misfeeds generally waste operator time and tubular welding wire. Additionally, in certain circumstances, such wire misfeeds may adversely affect operation of the welding system 10 (e.g., the welding wire feeder 40, the wire spool 38, or similar wire feeding components of the welding system 10), creating additional costs. Accordingly, certain embodiments of the presently disclosed tubular welding wire 12 utilize metal or metallic sheaths having manganese and/or silicon (e.g., alloyed into the metal). In certain embodiments, these higher-alloy metal sheaths demonstrate improved stiffness, which may generally improve the feeding of the tubular welding wire 12 through the welding system 10.

Figure 2:
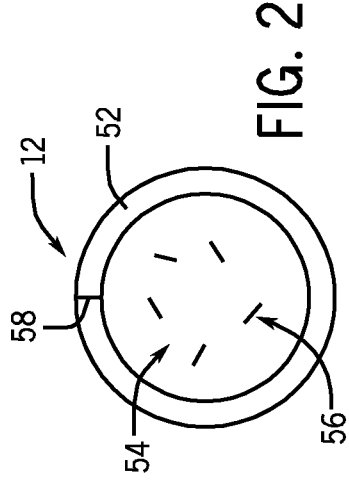
FIG. 2 is a cross-sectional view of a tubular welding electrode, in accordance with embodiments of the present disclosure.

A cross-section of an embodiment of the presently disclosed tubular welding wire 12 (or tubular welding rod) is illustrated in FIG. 2. FIG. 2 is a cross-sectional view of an embodiment of the tubular welding wire 12 that includes a metallic sheath 52 encapsulating a granular or powdered core 54. For example, the tubular welding wire 12 may be a metal cored tubular wire. Additionally, in certain embodiments, the granular core 54 may be partially or completely absent, leaving a void within the tubular welding wire 12.

The metallic sheath 52 may include any suitable metal or alloy (e.g., iron, high-carbon steel, low-carbon steel, or other suitable metal or alloy) having a manganese and/or silicon content, in accordance with aspects of the present technique. For example, in certain embodiments, the metallic sheath 52 may include 80%, 90%, 95%, or 98% iron or steel. It should be appreciated that since the metallic sheath 52 may generally provide at least a portion of the filler metal for the weld, the composition of the metallic sheath 52 may affect the composition of the resulting weld. For example, in addition to the manganese and/or silicon, the metallic sheaths 52 may include other additives or impurities (e.g., carbon, sulfur, phosphorus, copper, nickel, tin, chromium, and/or other elements) that may also affect the properties of the weld. For example, in certain embodiments, the metallic sheaths 52 may include less than approximately 0.1%, less than approximately 0.02%, or between approximately 0.08% and 0.1% carbon by weight. Additionally, in certain embodiments, the metallic sheaths 52 may include less than approximately 0.02%, less than approximately 0.015%, or less than approximately 0.01% sulfur by weight. Furthermore, in certain embodiments, the metallic sheaths 52 may include less than approximately 0.02%, less than approximately 0.015%, or less than approximately 0.01% phosphorus by weight.

With respect to the manganese content, in certain embodiments, the manganese content of the metallic sheath 52 may generally be greater than approximately 0.3% or 0.6% by weight. In certain embodiments, the metallic sheath 52 may include between approximately 0.1% and approximately 2% manganese by weight, between approximately 0.2% and approximately 1.9% manganese by weight, between approximately 0.6% and approximately 1.8% manganese by weight, between approximately 0.8% and approximately 2% manganese by weight, between approximately 0.9% and approximately 1.1% manganese by weight, or any subranges in between. With respect to the silicon content, in certain embodiments, the silicon content of the metallic sheath 52 may generally be greater than approximately 0.05% or 0.1% by weight. In certain embodiments, the metallic sheath 52 may include between approximately 0.2% and approximately 0.3% silicon by weight, between approximately 0.25% and approximately 0.35% silicon by weight, between approximately 0.3% and approximately 0.75% silicon by weight, between approximately 0.25% and approximately 0.75% silicon by weight, or any subranges in between.

As mentioned, the manganese and/or silicon included in the metallic sheath 52 may affect the physical properties of the metallic sheath 52 and the tubular welding wire 12. For example, an embodiment of the metallic sheath 52 may have a fracture toughness such that only pressures greater than approximately 68,000 psi, or between approximately 68,000 psi and 69,000 psi, may induce fracture. In contrast, similarly sized metallic welding strips lacking the manganese and/or silicon content presently disclosed may have a fracture toughness such that pressures of between approximately 43,000 to 52,000 psi may induce fracture. Accordingly, the addition of the manganese and/or silicon to the metallic sheath 52 may generally provide improved mechanical and/or physical properties (e.g., fracture toughness, tensile strength, stiffness, and the like) that may improve the ability of the resulting tubular welding wire 12 to properly feed within the welding system 10.

The granular core 54 of the illustrated tubular welding wire 12 may generally be a compacted powder with a composition that, as discussed below, may include components (e.g., filler metals, fluxes, stabilizers, and the like) that affect the welding process. For example, in certain embodiments, the granular core 54 of the tubular welding electrode 12 may include elements (e.g., iron, titanium, barium, lithium, fluorine, or other elements) and/or minerals (e.g., pyrite, magnetite, and so forth) to provide arc stability and to control the chemistry of the resulting weld. The various components of the granular core 54 may be homogenously or non-homogenously (e.g., in clumps or clusters 56) disposed within the granular core 54. Since the manganese and/or silicon components of the tubular welding wire 12 may be provided by the metallic sheath 52, in certain embodiments, the granular core 54 may be substantially free (e.g., approximately 0% by weight, only including trace amounts, or less than approximately 0.01% or 0.05%) of manganese and/or silicon. For example, in certain embodiments, the granular core 54 of the tubular welding wire 12 may include less than 5%, 2%, 1%, 0.5%, 0.05%, or 0.01% manganese by weight. By further example, in certain embodiments, the granular core 54 of the tubular welding wire 12 may include less than 5%, 2%, 1%, 0.5%, 0.05%, or 0.01% silicon by weight. It should be appreciated that, under the conditions of the arc 34, the components of the tubular welding wire 12 (e.g., the metal sheath 52, the granular core 54, and so forth) may change physical state, chemically react (e.g., oxidize, decompose, and so forth), or become incorporated into the weld substantially unmodified by the weld process.

Figure 3:
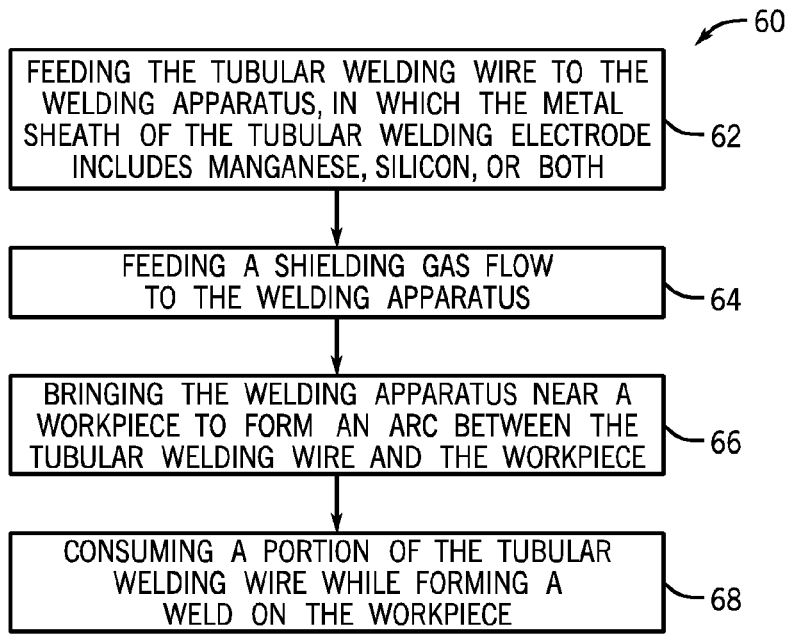
FIG. 3 is a flow chart of a process by which the tubular welding electrode may be used to weld a workpiece, in accordance with embodiments of the present disclosure.

FIG. 3 is a flow chart of a process 60 by which a workpiece 22 may be welded using the disclosed welding system 10 and the tubular welding electrode 12, which includes a metal sheath 52 having manganese, silicon, or both. The illustrated process 60 begins with feeding (block 62) the tubular welding wire 12 to a welding apparatus (e.g., the welding torch 18), in which the tubular welding wire 12 includes manganese and/or silicon. Additionally, the process 60 includes feeding (block 64) a shielding gas flow (e.g., 100% argon, 75% argon/25% carbon dioxide, 90% argon/10% helium, or similar shielding gas flow) to the welding apparatus (e.g., the contact tip of the welding torch 18). In other embodiments, welding systems may be used that do not use a gas supply system (e.g., such as the gas supply system 16 illustrated in FIG. 1), and one or more components (e.g., aluminum, iron, various fluoride salts, or other components) of the tubular welding wire 12 may provide a shielding gas component. Next, the tubular welding wire 12 may be brought near (block 66) (e.g., 0.25 mm, 0.5 mm, 1 mm, 2 mm, 3 mm, 5, mm, 10 mm, or generally less than 30 mm away from) the workpiece 22 such that an arc 34 may be formed between the tubular welding wire 12 and the workpiece 22. It should be appreciated that the arc 34 may be produced using a DCEP, DCEN, DC variable polarity, balanced or unbalanced AC power configuration for the GMAW system 10. Furthermore, in certain embodiments (e.g., SAW welding systems), a granular flux (e.g., a SAW flux) may be provided at or near the arc and/or weld pool in order to provide at least a portion of the atmosphere at or near the arc and/or weld pool in addition to (or in alternative to) the shielding gas flow. Then, a portion of the tubular welding wire 12 is consumed (block 68) while forming the weld on the workpiece 22. In certain embodiments, the manganese and/or silicon disposed in the metallic sheath 52 may be liberated to interact with the arc 34 and/or, at least partially, become incorporated into the weld.

It may generally be appreciated that the loading of components (e.g., manganese and/or silicon) into the metal sheath 52 rather than the granular core 54 may also have an effect on how these materials react in the arc 34 and/or are incorporated into the welding process. That is, an advantage of disposing the manganese and/or silicon in the metallic sheath 52 rather than the granular core 54 may be that a greater portion of the manganese and/or silicon reaches the weld (e.g., rather than forming fumes). In other words, there may be substantial or subtle differences in the arc 34 and/or weld pool conditions (e.g., temperature, voltage, relative positions of reactants, and the like) experienced by the manganese and/or silicon components delivered via the metallic sheath 52 rather than by the granular core 54. Accordingly, in certain embodiments, the disclosed tubular welding wire 12 may produce fumes having a lower manganese concentration than other welding wires having manganese supplied by the granular core 54. Furthermore, in certain embodiments, the total amount of a component (e.g., manganese and/or silicon) that may be used when delivering the component via the metallic sheath 52 may be substantially less than the amount of the component used when delivering the component to the weld via the granular core 54, since less of the component may be consumed in the formation of welding byproducts (e.g., fumes and/or slag).

Figure 4:
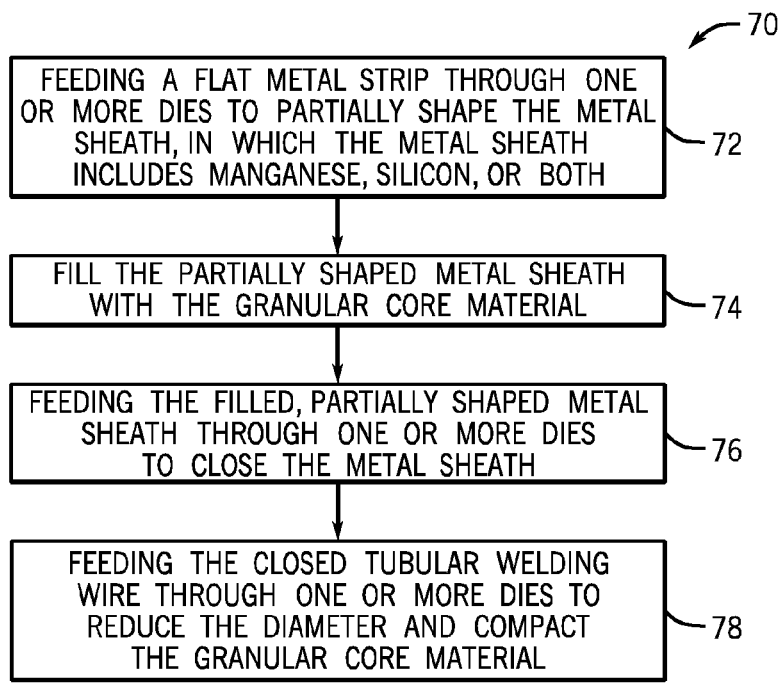
FIG. 4 is a flow chart of a process for manufacturing the tubular welding electrode, in accordance with embodiments of the present disclosure.

FIG. 4 is a flow chart of a process 70 by which the tubular welding electrode 12 may be manufactured. The process 70 begins with a flat metal strip (i.e., including manganese, silicon, or both) being fed (block 72) through a number of dies that shape the strip into a partially circular metal sheath 52 (e.g., producing a semicircle or trough). After the metal strip has been at least partially shaped into the metal sheath 52, it may be filled (block 74) with the granular core material 54. Accordingly, the partially shaped metal sheath 52 may be filled with various powdered fluxing and alloying components (e.g., iron, iron oxide, fluoride salts, or similar fluxing and/or alloying components). In certain embodiments, no manganese or silicon components may be added to the partially shaped metal sheath 52. Once the partially shaped metal sheath 52 has been filled with the various components of the granular core 54, the partially shaped metal sheath 52 may then be fed through (block 76) one or more dies that may generally close the metal sheath 52 such that it substantially surrounds the granular core material 54 (e.g., forming a seam 58, such as shown in FIG. 2). Additionally, the closed metal sheath 52 may subsequently be fed through (block 78) a number of dies (e.g., drawing dies) to reduce the diameter of the tubular welding wire 12 by compressing the granular core material 54.

It should be appreciated that while improving the stiffness of the metal sheath of a tubular welding wire 12 may improve the feeding of tubular welding wire 12, this approach also presents certain challenges. For example, by increasing the stiffness of the metal sheath 52 of the tubular welding electrode 12, the amount of cold working used to shape the metal sheath 52 around the granular core 54 (e.g., in blocks 72, 76, and 78) may also increase. Furthermore, since the hardness of the metal sheath 52 may also increase with the addition of the manganese and/or silicon components, the aforementioned dies (e.g., in blocks 72, 76, and 78) that may be used to shape the metal sheath 52 around the granular core 54 may wear more quickly due to the increased stiffness and/or hardness of the tubular welding wire 12. Additionally, the dies used to shape the metal sheath 52 during the manufacture of the tubular welding wire 12 may be manufactured from a material also having improved mechanical properties (e.g., a harder or tougher die material) in order to accommodate the altered mechanical properties of the disclosed tubular welding wire 12 embodiments. As such, there may be design challenges when attempting to improve the feeding of tubular welding wire 12 by increasing the stiffness of the metal sheath, as presently disclosed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A consumable tubular welding wire, comprising:
   a granular core; and
   a metal sheath encircling the granular core, wherein the metal sheath comprises at least approximately 0.6% manganese by weight and at least approximately 0.05% silicon by weight, and wherein the granular core comprises less than 2% manganese by weight and less than 2% silicon by weight, wherein the metal sheath is configured to withstand pressures up to approximately 68,000 pounds per square inch (psi) before fracturing.

2. The tubular welding wire of claim 1, wherein the metal sheath comprises between approximately 0.8% and approximately 2% manganese by weight.

3. The tubular welding wire of claim 1, wherein the metal sheath comprises between approximately 0.9% and approximately 1.1% manganese by weight.

4. The tubular welding wire of claim 1, wherein the metal sheath comprises between approximately 0.2% and approximately 0.3% silicon by weight.

5. The tubular welding wire of claim 1, wherein the metal sheath comprises between approximately 0.25% and approximately 0.75% silicon by weight.

6. The tubular welding wire of claim 1, wherein the granular core comprises less than approximately 0.5% manganese by weight and less than approximately 0.5% silicon by weight.

7. The tubular welding wire of claim 1, wherein the granular core comprises less than 0.05% manganese by weight and comprises less than 0.05% silicon by weight.

8. The tubular welding wire of claim 1, wherein the granular core comprises less than 1% manganese by weight and comprises less than 1% silicon by weight.

9. The tubular welding wire of claim 1, wherein the tubular welding wire is configured for use with a shielding gas.

10. A method of manufacturing a consumable tubular welding wire, comprising:
    compressing a powdered core within a metallic sheath using a plurality of dies, wherein the metallic sheath comprises at least approximately 0.6% manganese by weight and comprises at least approximately 0.1% silicon by weight, wherein the powdered core comprises less than 2% manganese by weight and less than 2% silicon by weight wherein the plurality of dies are manufactured from a material having a suitable hardness and toughness to compress the powdered core within the metallic sheath.

11. The method of claim 10, wherein the metallic sheath comprises less than approximately 2% manganese by weight and less than approximately 0.75% silicon by weight.

12. The method of claim 10, wherein the powdered core comprises less than 0.05% manganese by weight and comprises less than 0.01% silicon by weight.

13. The method of claim 10, wherein the powdered core comprises less than approximately 0.5% manganese by weight and less than approximately 0.5% silicon by weight.

14. The method of claim 10, wherein the powdered core does not include components that provide shielding gas during a welding operation.

15. The method of claim 10, wherein the powdered core comprises less than 1% manganese by weight and less than 1% silicon by weight.

* * * * *